(12) United States Patent
Liu

(10) Patent No.: US 9,456,175 B2
(45) Date of Patent: Sep. 27, 2016

(54) CAPTION SEARCHING METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Gang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/689,419

(22) Filed: Apr. 17, 2015

(65) Prior Publication Data

US 2015/0222848 A1    Aug. 6, 2015

Related U.S. Application Data

(63) Continuation of application No. PCT/CN2013/084263, filed on Sep. 26, 2013.

(30) Foreign Application Priority Data

Oct. 18, 2012    (CN) .......................... 2012 1 0398027

(51) Int. Cl.
| | |
|---|---|
| *H04N 7/00* | (2011.01) |
| *H04N 11/00* | (2006.01) |
| *H04N 7/088* | (2006.01) |
| *H04N 21/482* | (2011.01) |
| *H04N 21/81* | (2011.01) |
| *G06F 17/30* | (2006.01) |
| *G10L 15/08* | (2006.01) |
| *G10L 25/57* | (2013.01) |
| *G10L 15/26* | (2006.01) |

(52) U.S. Cl.
CPC ...... *H04N 7/0882* (2013.01); *G06F 17/30705* (2013.01); *G10L 15/08* (2013.01); *G10L 25/57* (2013.01); *H04N 21/4828* (2013.01); *H04N 21/8133* (2013.01); *G10L 15/26* (2013.01)

(58) Field of Classification Search
CPC ........... H04N 7/0882; H04N 21/4884; H04N 5/44513
USPC ........................................................ 348/468
See application file for complete search history.

(56) References Cited

U.S. PATENT DOCUMENTS

| | | | |
|---|---|---|---|
| 5,703,655 A | 12/1997 | Corey et al. | |
| 2007/0011012 A1* | 1/2007 | Yurick | G10L 15/26 704/277 |
| 2010/0183278 A1* | 7/2010 | Black | G11B 27/034 386/278 |

FOREIGN PATENT DOCUMENTS

| | | |
|---|---|---|
| CN | 102074235 A | 5/2011 |
| CN | 102087668 A | 6/2011 |

OTHER PUBLICATIONS

The World Intellectual Property Organization (WIPO) International Search Report for PCT/CN2013/084263 Jan. 2, 2014.

*Primary Examiner* — Michael Lee
(74) *Attorney, Agent, or Firm* — Anova Law Group, PLLC

(57) ABSTRACT

The present disclosure provides a caption searching method including: obtaining characteristic information of a video file to be played, and searching for a caption, for the video file to be played, in a caption database according to the characteristic information, so as to generate a search result; performing, according to the search result, a voice textualization process on the video file to be played; and updating the caption database according to a textualized caption generated by the voice textualization process, and using an updated caption in the caption database as a caption of the video file to be played. The present disclosure further provides an electronic device and storage medium for the caption searching. In this manner, a search for a caption is based on audio information recognition from the video file, to increase a hit rate and reduce an error rate of caption matching.

12 Claims, 3 Drawing Sheets

CAPTION SEARCHING METHOD, ELECTRONIC DEVICE, AND STORAGE MEDIUM

CROSS-REFERENCES TO RELATED APPLICATIONS

This application is a continuation of PCT Application No. PCT/CN 2013/084263, filed on Sep. 26, 2013, which claims priority to Chinese Patent Application No. CN 201210398027.1, filed on Oct. 18, 2012, the entire contents of all of which are incorporated herein by reference.

FIELD OF THE TECHNOLOGY

The present disclosure generally relates to the field of Internet technologies and, more particularly, relates to a caption searching method, electronic device, and storage medium.

BACKGROUND OF THE DISCLOSURE

With the rapid development of multimedia technologies and Internet technologies, video, as a media type, is becoming an important form for providing information in life, education, entertainment, and other aspects of people. A caption is a very important part in a video file, especially in a video file in a foreign language. Users often have difficulties in understanding the foreign language and often miss information in the video. Dubbing voice may be helpful but may hardly reproduce the effect of original sounds. As a result, captioning may be the most effective and convenient method to solve this problem.

Current mainstream players all provide the function of matching a video file with captions in an online caption library, but the matching has a low success rate or has a high error rate, resulting in poor user experience when users view captions. A main cause of the problem is that the online caption library is not rich enough for a player on a client, which leads to a low hit rate or a high error rate of caption matching of the player.

Therefore, there is a need to solve technical problems in the Internet and multimedia technologies to provide methods, devices, and storage media for searching captions for a video in any possible languages.

SUMMARY

An objective of the present disclosure is to provide a caption searching method, electronic device, and storage media that are based on audio information recognition, which can increase a hit rate and reduce an error rate of caption matching, so as to solve the technical problems that an existing video player has a low hit rate or a high error rate in caption matching.

In order to solve the problem, the present disclosure provides the following technical solutions. One aspect or embodiment of the present disclosure provides a caption searching method by obtaining characteristic information of a video file to be played, and searching for a caption, for the video file to be played, in a caption database according to the characteristic information, so as to generate a search result; performing, according to the search result, a voice textualization process on the video file to be played by extracting audio information of the video file to be played, and converting the audio information into a textualized caption; and updating the caption database according to the textualized caption generated by the voice textualization process, and using an updated caption in the caption database as a caption of the video file to be played.

Another aspect or embodiment of the present disclosure further provides an electronic device for searching a caption. The electronic device includes one or more processors; a memory; and one or more programs, stored in the memory and configured to be executed by the one or more processors to provide a caption searching method. The one or more programs are divided according to functions and include: a searching module, a voice textualization module, and an update module. The searching module is configured to obtain characteristic information of a video file to be played, and search for a caption, for the video file to be played, in a caption database according to the characteristic information, so as to generate a search result. The voice textualization module is configured to perform, according to the search result, a voice textualization process on the video file to be played. The voice textualization module includes an extraction unit, configured to extract audio information of the video file to be played; and a conversion unit, configured to convert the audio information into a textualized caption. The update module is configured to update the caption database according to the textualized caption generated by the voice textualization process, and to use an updated caption updated in the caption database as a caption of the video file to be played.

The present disclosure further provides a non-transitory computer readable storage medium, having instructions stored thereon. When being executed, the instructions cause the processor to implement a caption searching method. The method includes: obtaining characteristic information of a video file to be played, and searching for a caption, for the video file to be played, in a caption database according to the characteristic information, so as to generate a search result; performing a voice textualization process on the video file to be played according to the search result by extracting audio information of the video file to be played and converting the audio information into a textualized caption; and updating the caption database according to the textualized caption generated by the voice textualization process, and using an updated caption in the caption database as a caption of the video file to be played.

Compared with the existing technology, in the disclosed caption searching method, electronic device, and storage media of the present disclosure, a search for a caption is based on audio information recognition, which can increase a hit rate and reduce an error rate of caption matching, so as to solve the technical problems that an existing video player has a low hit rate or a high error rate in caption matching.

Other aspects or embodiments of the present disclosure can be understood by those skilled in the art in light of the description, the claims, and the drawings of the present disclosure.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts. In these accompanying drawings.

DESCRIPTION OF EMBODIMENTS

Refer to the figures, in which identical component symbols indicate identical components. The principle of the present disclosure is illustrated by using an example in which the present disclosure is implemented in a suitable computing environment. The following description is made based on exemplified specific embodiments of the present invention, and shall not be construed as a limitation on other specific embodiments of the present invention that are not detailed here.

In the description that follows, unless otherwise specified, the specific embodiments of the present invention will be described with reference to steps and symbols of operations that are performed by one or more computers. Therefore, it can be understood that execution of such steps and operations by a computer, as mentioned several times, includes manipulating, by a computer processing unit, electrical signals representing data in a structured form. This manipulation transforms the data or maintains it at locations in the memory system of the computer, which reconfigures or otherwise alters the operation of the computer in a manner well known by a person skilled in the art. The data structure where data is maintained is a physical location of the memory that has particular properties defined by the format of the data. However, while the principle of the present disclosure is described in the foregoing context, the present disclosure is not limited thereto, and a person skilled in the art will appreciate that various steps and operations described hereinafter may also be implemented in hardware.

The terms such as "component", "module", "system", and "interface" used in the present application are generally intended to refer to computer-related entities: hardware, a combination of hardware and software, software, or software in execution. For example, a component may be, but is not limited to, a process running on a processor, a processor, an object, an executable application, a thread in execution, a program, and/or a computer. As illustrated in the figures, both an application running on a controller and the controller can be a component. One or more components may reside within a process and/or thread in execution, and the component may be located on one computer and/or distributed between two or more computers.

Furthermore, the claimed subject matter may be implemented as a method, an apparatus, or a product that uses standard programming and/or engineering techniques to produce software, firmware, hardware, or any combination thereof to control a computer to implement the disclosed subject matter. The term "product" used herein is intended to encompass a computer program accessible to any computer-readable device, carrier, or medium. Certainly, a person skilled in the art will realize that many modifications may be made to this configuration without departing from the scope or spirit of the claimed subject matter.

Figure 1:
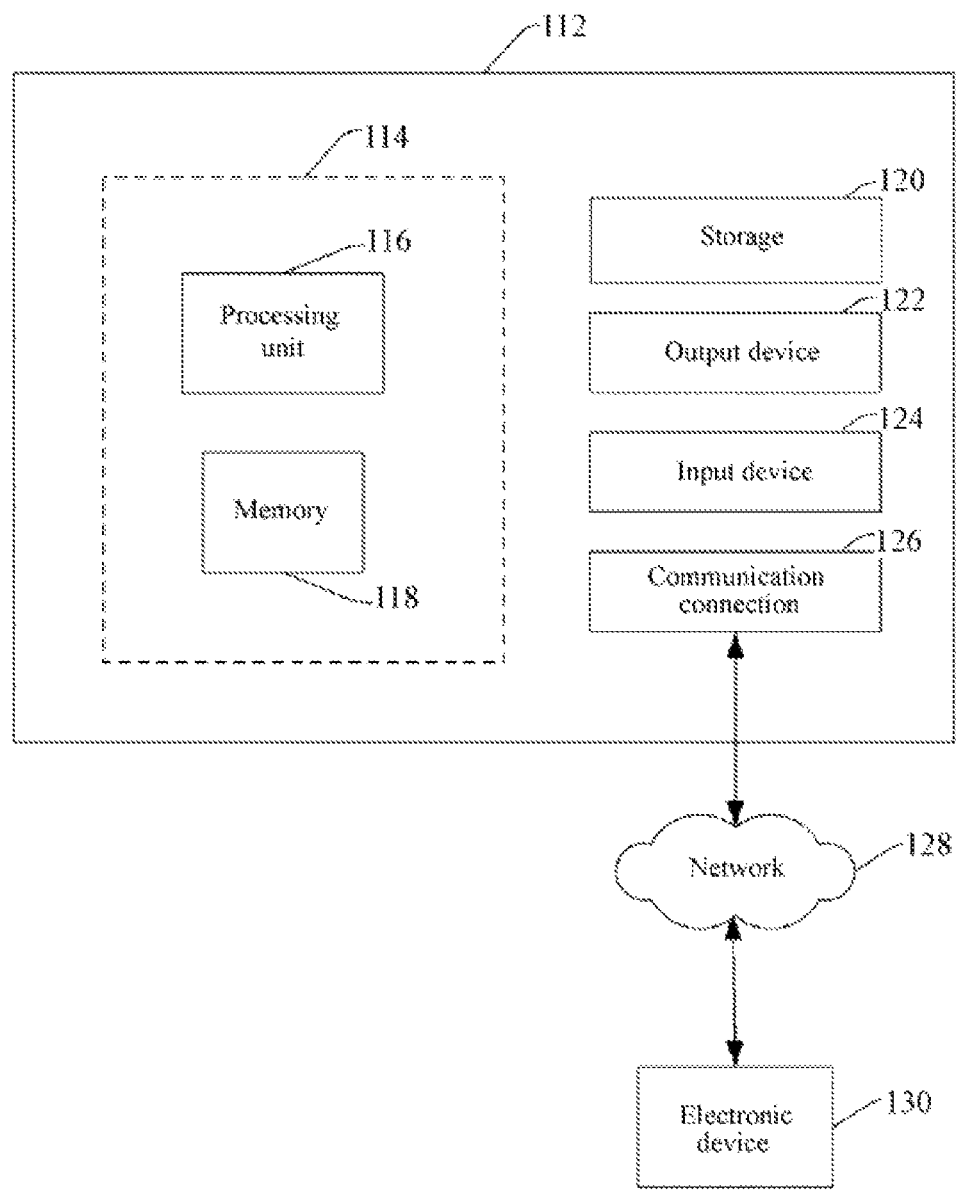
FIG. 1 is a schematic structural diagram illustrating an exemplary operating environment of an electronic device consistent with the disclosed embodiments in the present disclosure.

FIG. 1 illustrates an exemplary operating environment including an exemplary electronic device used for implementing the disclosed caption searching methods. For illustration purposes, the operating environment of FIG. 1 is used as an example and is not intended to limit the scope in use or in functions of the operating environment.

An exemplary electronic device 112 includes, but is not limited to, a personal computer, a server computer, a handheld or laptop device, a mobile device (such as a mobile phone, a personal digital assistant (PDA), or a media player), a multiprocessor system, a consumer electronic device, a mini computer, a mainframe computer, and/or a distributed computing environment that includes any of the foregoing systems or devices, and the like.

Although not required, "computer-readable instructions" may be executed by one or more exemplary electronic devices. The computer-readable instructions may be distributed by using a computer-readable medium, e.g., a non-transitory computer-readable medium (as discussed below). The computer-readable instructions may be implemented as program modules, such as functions, objects, application programming interfaces (APIs), or data structures that perform particular tasks or implement particular abstract data types. Typically, functions of the computer-readable instructions may be combined or distributed as desired in various environments.

For example, the electronic device 112 in FIG. 1 may be used to implement caption searching methods according to various disclosed embodiments in the present disclosure. In one configuration, the electronic device 112 includes a configuration 114, including at least one processing unit 116 and a memory 118. Depending on the exact configuration and type of the electronic device, the memory 118 may be volatile (such as a random access memory (RAM)), non-volatile (such as a read-only memory (ROM) or a flash memory) or combination(s) thereof.

In various embodiments, the electronic device 112 may include additional features and/or functions. For example, the device 112 may further include an additional storage device (for example, a removable and/or non-removable storage device), which includes, but is not limited to, a magnetic storage device, an optical storage device, and the like. Such additional storage device is illustrated in FIG. 1 as a storage device 120. In one embodiment, computer-readable instructions for implementing one or more embodiments of the present invention may be stored in the storage device 120. The storage device 120 may also store other computer-readable instructions for implementing an operating system, an application program, and the like. The computer-readable instructions may be loaded in the memory 118 and executed by, for example, the processing unit 116.

The term "computer-readable medium" used herein includes a computer storage medium. The computer storage medium includes volatile and non-volatile, removable and non-removable media implemented in any method or technology for storing information such as computer-readable instructions or other data. The memory 118 and the storage device 120 are examples of the computer storage medium. The computer storage medium includes, but is not limited to, a RAM, a ROM, an electrically erasable programmable read-only memory (EEPROM), a flash memory or other memory technologies, a CD-ROM, a digital versatile disk (DVD) or other optical storage devices, a magnetic cassette, a magnetic tape, a magnetic disk storage device or other magnetic storage devices, or any other medium that can be used to store desired information and is accessible to the electronic device 112. Any such computer storage medium may be a part of the electronic device 112.

The electronic device 112 may also include a communication connection 126 that allows the electronic device 112 to communicate with other devices or networks. The communication connection 126 may include, but be not limited to, a modem, a network interface card (NIC), an integrated network interface, a radio frequency transmitter/receiver, an infrared port, a universal serial bus (USB) connection, or other interfaces for connecting the electronic device 112 to other electronic devices. The communication connection 126 may include a wired connection or a wireless connection. The communication connection 126 may transmit and/or receive communication media.

The term "computer-readable medium" may include any suitable communication medium. Typically, the communication medium includes computer-readable instructions or other data in a "modulated data signal" such as a carrier wave or other transmission mechanisms and includes any information delivery medium. The term "modulated data signal" may include a signal that has one or more of its characteristics set or changed in such a manner as to encode information into the signal.

The electronic device 112 may include an input device 124 such as a keyboard, a mouse, a stylus, a voice input device, a touch input device, an infrared camera, a video input device, and/or any other suitable input device. The device 112 may also include an output device 122 such as one or more displays, speakers, printers, and/or any other output device. The input device 124 and the output device 122 may be connected to the electronic device 112 via a wired connection, a wireless connection, or any combination thereof. In one embodiment, an input device or an output device from another electronic device may be used as the input device 124 or the output device 122 of the electronic device 112.

Components of the electronic device 112 may be connected by various interconnects (such as a bus). Such interconnects may include a peripheral component interconnect (PCI) (such as PCI Express), a universal serial bus (USB), a firewire (IEEE 1394), an optical bus structure, and the like. In another embodiment, components of the electronic device 112 may be interconnected by a network. For example, the memory 118 may be formed by multiple physical memory units located in different physical locations interconnected by a network.

A person skilled in the art will realize that storage devices utilized for storing computer-readable instructions may be distributed across networks. For example, an electronic device 130 accessible via a network 128 may store computer-readable instructions for implementing one or more embodiments of the present invention. The electronic device 112 may access the electronic device 130 and download a part or all of the computer-readable instructions for execution. Alternatively, the electronic device 112 may download multiple computer-readable instructions as needed, or some instructions may be executed on the electronic device 112 and some on the electronic device 130.

Various operations are provided herein. In one embodiment, the one or more operations may constitute computer-readable instructions stored on one or more computer-readable media, and when being executed by an electronic device, the computer-readable instructions will cause a computing device to perform the operations. The order in which some or all of the operations are described should not be construed as to imply that these operations are necessarily related in such order. Alternative order of implementation having the benefit of this specification will be appreciated by a person skilled in the art. Further, it should be understood that not all operations are necessary in each embodiment provided herein.

Moreover, the word "preferred" is used herein to imply an example, instance, or illustration. Any aspect or design described herein as "preferred" is not necessarily to be construed as advantageous over other aspects or designs. Rather, use of the word "preferred" is intended to present concepts in a concrete fashion. As used in the present application, the term "or" is intended to imply an inclusive "or" rather than an exclusive "or". Therefore, unless specified otherwise, or clarified in the context, "X uses A or B" implies any of the natural inclusive permutations. That is, if X uses A; X uses B, or X uses both A and B, t"X uses A or B" is satisfied under any of the foregoing instances.

Although the present disclosure has been shown and described with respect to one or more implementations, a person skilled in the art will conceive of equivalent alterations and modifications after reading and understanding this specification and the accompanying drawings. The present disclosure includes all such modifications and alterations, and is only limited by the scope of the appended claims. In particular, regard to the various functions performed by the above described components (for example, elements and resources), the term used to describe such a component is intended to correspond to any component (unless otherwise indicated) that performs the specified function of the described component (for example, the component is functionally equivalent), even if not structurally equivalent to the disclosed structure which performs the function in the exemplary implementations of the present disclosure illustrated herein. In addition, while a particular feature of the present disclosure has been disclosed with respect to only one of several implementations, such feature may be combined with one or more other features of other implementations that may be desired by and beneficial to any given or particular application. Furthermore, to the extent that the terms "include", "have", "contain", and variants thereof are used in either the embodiments or the claims, these terms are intended imply inclusion similar to the term "comprise".

Figure 2:
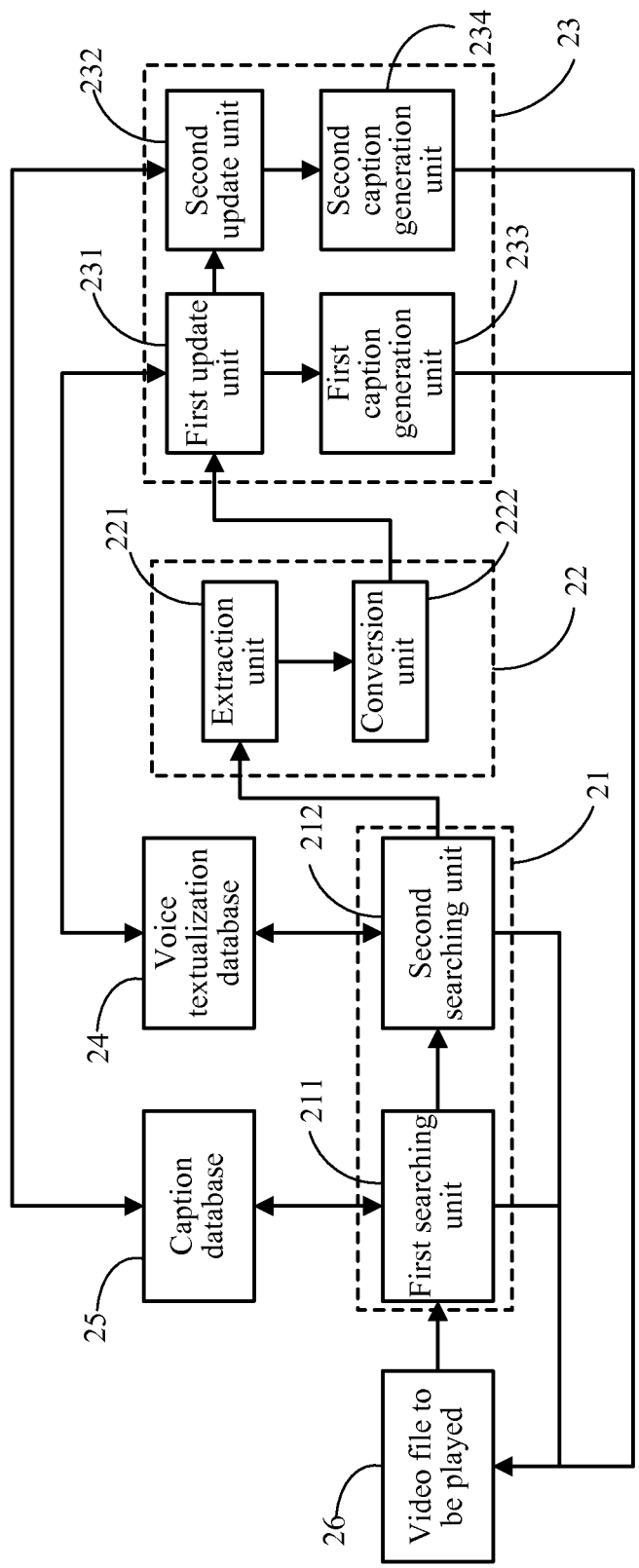
FIG. 2 is a schematic structural diagram of an exemplary electronic device consistent with the disclosed embodiments in the present disclosure.

The present disclosure provides an electronic device. As shown in FIG. 2, FIG. 2 is a schematic structural diagram of an exemplary embodiment of the electronic device in the present disclosure. The electronic device includes: one or more processors; a memory; and one or more programs/instructions, stored in the memory and configured to be executed by the one or more processors to provide a caption searching method. The one or more programs are divided according to functions and include a searching module 21, a voice textualization module 22, and/or an update module 23.

The searching module 21 is configured to obtain characteristic information of a video file 26 to be played, and search for a caption, for the video file 26 to be played, in a caption database 25 according to the characteristic information, so as to generate a search result. The voice textualization module 22 is configured to perform, according to the search result, voice textualization on the video file 26 to be played. The update module 23 is configured to update the caption database 25 according to a textualized caption generated by the voice textualization, and use an updated caption in the caption database 25 as a caption of the video file 26 to be played.

The caption database 25 includes a standard caption database and a voice textualization database. The standard caption database includes captions and hash codes of video files associated with the captions. The voice textualization database includes textualized captions and hash codes of video files associated with the textualized captions.

The searching module 21 includes a first searching unit 211 and a second searching unit 212. The first searching unit 211 is configured to obtain the characteristic information of the video file 26 to be played, and search for a caption, for the video file 26 to be played, in the standard caption database according to the characteristic information. Specifically, the first searching unit 211 returns, if a hash code of the video file 26 to be played exists in the standard caption database, a caption associated with the hash code. The second searching unit 212 is configured to search for a caption, for the video file 26 to be played, in the voice textualization database if the caption of the video file 26 to be played is not found in the standard caption database. Specifically, the second searching unit 212 returns, if the hash code of the video file 26 to be played exists in the voice textualization database, a textualized caption associated with the hash code.

The voice textualization module 22 includes an extraction unit 221 and a conversion unit 222. The extraction unit 221 is configured to extract audio information of the video file 26 to be played. The conversion unit 222 is configured to convert the audio information into the textualized caption.

The update module 23 includes a first update unit 231, a second update unit 232, a first caption generation unit 233, and a second caption generation unit 234. The first update unit 231 is configured to update the voice textualization database according to the textualized caption generated by the voice textualization process. The second update unit 232 is configured to compare the textualized caption generated by the voice textualization process with captions in the standard caption database, and if a caption the same as the textualized caption generated by the voice textualization exists in the standard caption database, update the standard caption database. Specifically, the second update unit 232 associates the video file corresponding to the textualized caption generated by the voice textualization process with the caption in the standard caption database. The first caption generation unit 233 is configured to use an updated caption updated in the voice textualization database as the caption of the video file 26 to be played. The second caption generation unit 234 is configured to use an updated caption in the standard caption database as the caption of the video file 26 to be played.

When the electronic device of the present disclosure is used, first, the standard caption database and the voice textualization database are created. Next, the first searching unit 211 of the searching module 21 first queries a hash code of the video file 26 to be played, then searches for the hash code in the standard caption database, and if the hash code of the video file 26 to be played exists in the standard caption database, returns a caption associated with the hash code to a user to complete the caption search. If the hash code of the video file 26 to be played does not exist in the standard caption database, the second searching unit 212 of the searching module 21 searches for, in the voice textualization database, the hash code of the video file 26 to be played, and if the hash code of the video file 26 to be played exists in the voice textualization database, returns a textualized caption associated with the hash code to the user to complete the caption search.

If the caption of the video file 26 to be played is found in neither the standard caption database nor the voice textualization database, the voice textualization module 22 performs voice textualization on the video file 26 to be played, and the first update unit 231 of the update module 23 stores, into the voice textualization database, a textualized caption obtained by means of conversion, for use in caption search, thereby updating the voice textualization database. At this time, the first caption generation unit 233 may use an updated caption in the voice textualization database as the caption of the video file 26 to be played.

Preferably, the second update unit 232 of the update module 23 may compare the textualized caption generated by the voice textualization process with captions in the standard caption database, and if a caption the same as the textualized caption generated by the voice textualization exists in the standard caption database, the second update unit 232 associates the caption with the video file corresponding to the textualized caption generated by the voice textualization process, namely, associates the caption with the hash code of the video file, thereby updating the standard caption database, which optimizes a matching hit rate of captions in the standard caption database. At this time, the second caption generation unit 234 may use an updated caption in the standard caption database as the caption of the video file 26 to be played. Certainly, the second update unit 232 and the second caption generation unit 234 here may be selected and set according to requirements of users.

The specific operating principle of the electronic device in the present disclosure is the same as or similar to that described in embodiments of a caption searching method below, and for details, refer to the detailed process of the preferred embodiment of the caption searching method below.

The electronic device according to this embodiment may be configured in a video player, to search for a caption of a video file that is being played in the video player. Meanwhile, the electronic device according to this embodiment may also be configured in a caption searching server that can provide users with a service of searching for a caption of a video file.

Figure 3:
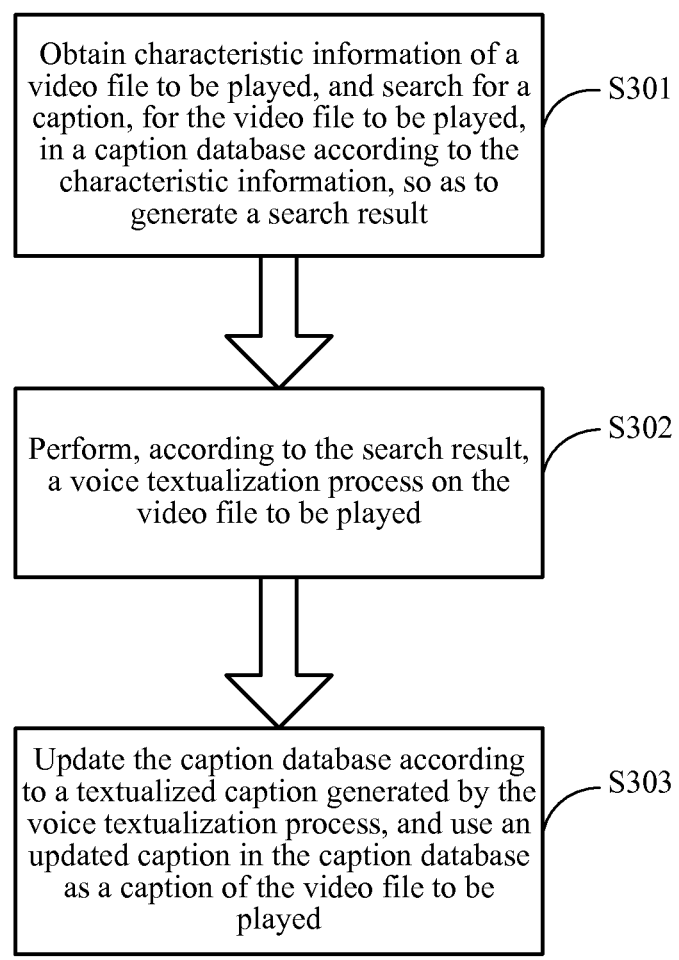
FIG. 3 is a flowchart of a preferred embodiment of an exemplary caption searching method consistent with the disclosed embodiments in the present disclosure.

The present disclosure further provides a caption searching method. Referring to FIG. 2 and FIG. 3, FIG. 3 is a flowchart of an exemplary embodiment of a caption searching method in the present disclosure. The caption searching method includes the following steps.

Step S301: includes obtaining characteristic information of a video file to be played, and searching for a caption, for the video file to be played, in a caption database according to the characteristic information, so as to generate a search result.

Step S302: includes performing, according to the search result, a voice textualization process on the video file to be played.

Step S303: includes updating the caption database according to a textualized caption generated by the voice textualization process, and using an updated caption in the caption database as a caption of the video file to be played.

The caption searching method according to this preferred embodiment may conclude at step S303. The voice textualization process includes: for example, extracting audio information of the video file 26 to be played and converting the audio information into the textualized caption, thereby textualizing the video file 26 to be played.

In the caption searching method according to this exemplary embodiment, voice textualization process is performed on a video file to be played whose caption cannot be found through matching, and the caption database 25 is updated according to a textualized caption obtained after the voice textualization process, thereby ensuring caption matching and increasing the matching hit rate for caption search next time.

The detailed process of each step of the exemplary embodiment of the caption searching method in the present disclosure is described below in detail.

Before step S301, a standard caption database and a voice textualization database are created to form the caption database 25. The standard caption database is a database in a standard caption format, and includes captions and hash codes of video files associated with the captions. The standard caption database may be created by manual input, or standard captions on caption websites may be downloaded by using a caption web crawler and the standard caption database may be updated periodically by using the caption web crawler.

The voice textualization database is a database created based on textualized captions, and includes textualized captions and hash codes of video files associated with the textualized captions. A textualized caption is a text formed by performing a voice recognition process on a video file, and includes textual dialogues of the video file and corresponding timestamps. The voice textualization database may be small at the beginning, but as the caption search proceeds, the voice textualization database may be gradually expanded (mainly by textualized captions of latest video files or textualized captions of some rare video files).

In step S301, first, the first searching unit 211 of the searching module 21 obtains characteristic information of the video file 26 to be played, and searches for a caption, for the video file 26 to be played, in the standard caption database according to the characteristic information. The characteristic information of the video file here refers to a characteristic value capable of identifying the video file, for example, a file name, a file size, a hash code of the entire file or part of the file, or a combination thereof. The characteristic information is described as being a hash code of the video file in this embodiment. In this step, the first searching unit 211 of the searching module 21 first queries a hash code of the video file 26 to be played, and then searches for the hash code in the standard caption database; if the hash code of the video file 26 to be played exists in the standard caption database, the first searching unit 21 returns a caption associated with the hash code to a user to complete the caption search, or if the hash code of the video file 26 to be played does not exist in the standard caption database, the first searching unit 21 determines that the standard caption database does not have the caption of the video file 26 to be played.

If the caption of the video file 26 to be played is not found in the standard caption database, the second searching unit 212 of the searching module 21 searches for a caption, for the video file 26 to be played, in the voice textualization database. In this step, similarly, the second searching unit 212 searches for, in the voice textualization database, the hash code of the video file 26 to be played; if the hash code of the video file 26 to be played exists in the voice textualization database, the second searching unit 212 returns a textualized caption associated with the hash code to the user to complete the caption search; or if the hash code of the video file 26 to be played does not exist in the voice textualization database, the second searching unit 212 determines that the voice textualization database does not have the caption of the video file 26 to be played.

Then, proceeding to step S302 and in step S302, if the caption of the video file 26 to be played is found in neither the standard caption database nor the voice textualization database, the voice textualization module 22 performs a voice textualization process on the video file 26 to be played.

First, the extraction unit 221 of the voice textualization module 22 extracts audio information of the video file 26 to be played, namely, separates a voice signal in the video file 26 to be played from video. No matter how many voices the video file 26 to be played includes, one main voice signal (audio information) can be output by using the voice recognition technology. Afterwards, the conversion unit 222 of the voice textualization module 22 converts the audio information into a textualized caption, namely, converts the audio information into dialog texts and corresponding timestamps. The dialog texts may be in Chinese, English, or any other suitable language, and the conversion should have a certain fault tolerance.

Then, proceeding to step S303 and in step S303, the first update unit 231 of the update module 23 updates the voice textualization database according to the textualized caption generated by the voice textualization process; and the first caption generation unit 233 of the update module 23 uses an updated caption in the voice textualization database as the caption of the video file 26 to be played. The update of the voice textualization database here mainly includes: storing, into the voice textualization database, the textualized caption generated by the voice textualization and a hash code of the video file associated with the textualized caption.

Furthermore, in this step, the second update unit 232 of the update module 23 may further compare the textualized caption generated by the voice textualization process with captions in the standard caption database, and if a caption the same as the textualized caption generated by the voice textualization exists in the standard caption database, the second update unit 232 of the update module 23 updates the standard caption database, and the second caption generation unit 234 of the update module 23 uses an updated caption in the standard caption database as the caption of the video file 26 to be played; or if no caption the same as the textualized caption generated by the voice textualization exists in the standard caption database, the first caption generation unit 233 of the update module 23 uses the updated caption in the voice textualization database as the caption of the video file 26 to be played.

Because the standard caption database is a database in the standard caption format, and captions in such database have high quality, textualized captions in the voice textualization database may be associated with the captions in the standard caption database as much as possible in this step, so that high-quality captions in the standard caption database can be used directly for more video files.

Both a caption and a textualized caption include character strings (dialogue texts) and corresponding timestamps. Specifically, during comparison, a caption and a textualized caption whose total play times are approximately the same are selected to be compared; character strings at n (n is greater than or equal to 2) random time points (for example, at 5 minutes, 10 minutes, or 20 minutes) of the textualized caption are selected to be compared with character strings at the corresponding time points of the caption (the selection of time points here should allow a certain error tolerance, for example, the character string selected from the textualized caption is separately compared with 10 character strings before or after the time point in the caption), and if each character string, subject to comparison, of the textualized caption has a corresponding character string matching therewith in the caption, it is determined that a caption the same as the textualized caption generated by the voice textualization process exists in the standard caption database; or otherwise, it is determined that no caption the same as the textualized caption generated by the voice textualization exists in the standard caption database.

If a caption the same as the textualized caption generated by the voice textualization process exists in the standard caption database, the second update unit 232 associates the caption with the video file corresponding to the textualized caption generated by the voice textualization process, namely, associates the caption with a hash code of the video file, and stores the hash code of the video file into the standard caption database, thereby updating the standard caption database.

In this way, the whole caption search process of the video file 26 to be played and the corresponding update process of the caption database 25 are completed.

It should be noted here that the step of comparing the textualized caption generated by the voice textualization process with a caption in the standard caption database and the step of updating the standard caption database in step S303 are intended to optimize the matching hit rate of captions in the standard caption database, and the two exemplary steps may also be omitted according to requirements of users.

Meanwhile, the order of the steps in this exemplary embodiment does not limit the protection scope of the present disclosure. For example, for a latest video file, the process may start from step S302 directly to update the voice textualization database, without searching for a caption in the caption database 25. Therefore, performing the above described steps of the present disclosure in any other order can also achieve the effect of optimizing the hit rate of caption matching, and also falls within the protection scope of the present disclosure.

A person of ordinary skill in the art may understand that all or some of the processes in the method according to the foregoing embodiment may be implemented by a computer program instructing relevant hardware. The program may be stored in a computer-readable storage medium. The program, when being executed, may include the process of the disclosed method. The storage medium may be a magnetic disk, an optical disc, a read-only memory (ROM), a random access memory (RAM), or the like.

In the disclosed caption searching methods, electronic devices, and storage media of the present disclosure, a search for a caption is based on audio information recognition, which increases a hit rate and reduces an error rate of caption matching. Meanwhile, a standard caption database and a voice textualization database are updated in time according to a textualized caption generated by voice textualization process, which optimizes the matching hit rate of captions in the standard caption database and the voice textualization database.

To sum up, although the present disclosure has been disclosed above through the exemplary embodiments, these exemplary embodiments are not intended to limit the present disclosure. A person of ordinary skilled in the art can make various variations and modifications without departing from the spirit and scope of the present disclosure. Therefore, the protection scope of the present disclosure is subject to the appended claims.

What is claimed is:

1. A caption searching method, comprising:
   obtaining characteristic information of a video file to be played, and searching for a caption for the video file to be played, in a caption database according to the characteristic information, so as to generate a search result;
   performing, according to the search result, a voice textualization process on the video file to be played by extracting audio information of the video file to be played, and converting the audio information into a textualized caption; and
   updating the caption database according to the textualized caption generated by the voice textualization process, and using, an updated caption in the caption database as a caption of the video file to be played;
   wherein:
   the caption database comprises a standard caption database and a voice textualization database;
   the step of performing, according to the search result, the voice textualization process on the video file to be played comprises:
      performing the voice textualization process on the video file to be played if the caption of the video file to be played is not found in the caption database; and
   the step of updating the caption database according to the textualized caption generated by the voice textualization process, and using the updated caption in the caption database as the caption of the video file to be played comprises:
      updating the voice textualization database according to the textualized caption generated by the voice textualization process,
      comparing the textualized caption generated by the voice textualization process with captions in the standard caption database, and
      if a caption is the same as the textualized caption generated by the voice textualization process and exists in the standard caption database, updating the standard caption database, and using an updated caption in the standard caption database as the caption of the video file to be played; or
      if no caption is the same as the textualized caption generated by the voice textualization process exists in the standard caption database, using the updated caption in the voice textualization database as the caption of the video file to be played.

2. The caption searching method according to claim 1, wherein:
   the step of obtaining the characteristic information of the video file to be played, and searching for the caption to generate a search result comprises:
      obtaining the characteristic information of the video file to be played, and searching for the caption for the video file to be played in the standard caption database according to the characteristic information; and
      searching for the caption, for the video file to be played in the voice textualization database if the caption of the video file to be played is not found in the standard caption database, so as to generate the search result.

3. The caption searching method according to claim 1, wherein:
   associating, if the caption is the same as the textualized caption generated by the voice textualization process and exists in the standard caption database, the caption with the video file corresponding to the textualized caption generated by the voice textualization process.

4. The caption searching method according to claim 2, wherein:
   the characteristic information of the video file is hash code of the video tile, the standard caption database comprises captions and hash codes of video files associated with the captions; the voice textualization database comprises textualized captions and hash codes of video files associated with textualized captions;

the step of obtaining the characteristic information of the video file to be played, and searching for the caption, for the video file to be played, in the standard caption database according to the characteristic information comprises:

returning, if the hash code of the video file to be played exists in the standard caption database, a caption associated with the hash code; or searching for a caption in the voice textualization database, for the video file to be played if the hash code of the video file to be played does not exist in the standard caption database; and the step of searching for the caption, for the video file to be played, in the voice textualization database if the caption of the video file to be played is not found in the standard caption database, so as to generate the search result comprises:

returning, if the hash code of the video file to be played exists in the voice textualization database, a textualized caption associated with the hash code; or performing the voice textualization process on the video file to be played if the hash code of the video file to be played does not exist in the voice textualization database.

5. An electronic device, comprising:

one or more processors;

a memory; and one or more programs, stored in the memory and configured to be executed by the one or more processors to provide a caption searching method, the one or more programs divided according to functions and comprising:

a searching module, configured to obtain characteristic information of a video file to be played, and search for a caption, for the video file to be played, in a caption database according to the characteristic information, to generate a search result;

a voice textualization module configured to perform, according to the search result, a voice textualization process on the video file to be played, wherein the voice textualization module comprising an extraction unit, configured to extract audio information of the video file to be played; and a conversion unit, configured to convert the audio information into a textualized caption; and an update module, configured to update the caption database according to the textualized caption generated by the voice textualization process, and to use an updated caption in the caption database as caption of the video file to be played;

wherein:

the caption database comprises a standard caption database and a voice textualization database;

the voice textualization module is configured to perform the voice textualization process on the video file to be played if the caption of the video file to be played is not found in the caption database; and the update module comprises:

a first update unit, configured to update the voice textualization database according to the textualized caption generated by the voice textualization process; and a first caption generation unit, configured to use an updated caption updated in the voice textualization database as the caption of the video file to be played, a second update unit, configured to compare the textualized caption generated by the voice textualization process with captions in the standard caption database, and if a caption is the same as the textualized caption generated by the voice textualization process and exists in the standard caption database, to update the standard caption database; and a second caption generation unit, configured to use the updated caption updated in the standard caption database as the caption of the file to be played.

6. The electronic device according to claim 5, wherein the searching module comprises:

a first searching unit, configured to obtain the characteristic information of the video file to be played, and to search for the caption, for the video file to be played, in the standard caption database according to the characteristic information; and a second searching unit, configured to search for the caption, for the video file to be played, in the voice textualization database if the caption of the video file to be played is not found in the standard caption database, so as to generate a search result.

7. The electronic device according to claim 5, wherein the second update unit is configured to associate, if the caption is the same as the textualized caption generated by the voice textualization process and exists in the standard caption database, the caption with the video file corresponding to the textualized caption generated by the voice textualization process.

8. The electronic device according to claim 6, wherein:

the characteristic information of the video file is a hash code of the video file, the standard caption database comprises captions and hash codes of video files associated with the captions, and the voice textualization database comprises textualized captions and hash codes of video flies associated with the textualized captions;

the first searching unit is configured to: return, if the hash code of the video file to be played exists in the standard caption database, a caption associated with the hash code; and the second searching unit is configured to: return, if the hash code of the video file to be played exists in the voice textualization database, a textualized caption associated with the hash code.

9. A non-transitory computer readable storage medium, comprising instructions stored thereon, wherein, when being executed, the instructions cause the processor to implement a caption searching method comprising:

obtaining characteristic information of a video file to be played, and searching for a caption, for the video file to be played, in a caption database according to the characteristic information, so as to generate a search result;

performing, according to the search result, a voice textualization process on the video file to be played by extracting audio information of the video file to be played, and converting the audio information into a textualized caption; and updating the caption database according to the textualized caption generated by the voice textualization process, and using an updated caption in the caption database as a caption of the video file to be played;

wherein:

the caption database comprises a standard caption database and a voice textualization database;

the step of performing, according to the search result, the voice textualization process on the video file to be played comprises:
performing the voice textualization process on the video file to be played if the caption of the video file to be played is not found in the caption database; and
the step of updating the caption database according to the textualized caption generated, by the voice textualization process, and using the updated caption in the caption database as the caption of the video file to be played comprises:
updating the voice textualization database according to the textualized caption generated by the voice textualization process,
comparing the textualized caption generated by the voice textualization process with captions in the standard caption database, and
if a caption is the same as the textualized caption generated by the voice textualization process and exists in the standard caption database, updating the standard caption database, and using an updated caption in the standard caption database as the caption of the video file to be played; or
if no caption is the same as the textualized caption generated by the voice textualization process exists in the standard caption database, using the updated caption in the voice textualization database as the caption of the video file to be played.

10. The storage medium according to claim 9, wherein:
the step of obtaining the characteristic information of the video file to be played, and searching for the caption to generate a search result comprises:
obtaining the characteristic information of the video file to be played, and searching for the caption for the video file to be played in the standard caption database according to the characteristic information; and
searching for the caption, for the video file to be played in the voice textualization database if the caption of the video file to be played is not found in the standard caption database, so as to generate the search result.

11. The storage medium according to claim 9, wherein:
associating, if the caption is the same as the textualized caption generated by the voice textualization process and exists in the standard caption database, the caption with the video file corresponding to the textualized caption generated by the voice textualization process.

12. The storage medium according to claim 10, wherein:
the characteristic information of the video file is a hash code of the video file, the standard caption database comprises captions and hash codes of video files associated with the captions; the voice textualization database comprises textualized captions and hash codes of video files associated with the textualized captions;
the step of obtaining the characteristic information of the video file to be played, and searching for the caption, for the video file to be played, in the standard caption database according to the characteristic information comprises:
returning, if the hash code of the video file to be played exists in the standard caption database, a caption associated with the hash code; or
searching for a caption in the voice textualization database, for the video file to be played if the hash code of the video file to be played does not exist in the standard caption database; and
the step of searching for the caption, for the video file to be played, in the voice textualization database if the caption of the video file to be played is not found in the standard caption database, so as to generate the search result comprises:
returning, if the hash code of the video file to be played exists in the voice textualization database, a textualized caption associated with the hash code; or
performing the voice textualization process on the video file to be played if the hash code of the video file to be played does not exist in the voice textualization database.

* * * * *